United States Patent
Fujiki et al.

(10) Patent No.: US 9,649,600 B2
(45) Date of Patent: May 16, 2017

(54) METHOD FOR MANUFACTURING A POROUS COMPOSITE MEMBRANE

(75) Inventors: Hiroyuki Fujiki, Otake (JP); Toshinori Sumi, Otake (JP); Yasuo Hiromoto, Otake (JP); Masaki Kurashina, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 441 days.

(21) Appl. No.: 13/265,962

(22) PCT Filed: Apr. 23, 2010

(86) PCT No.: PCT/JP2010/057225
§ 371 (c)(1),
(2), (4) Date: Oct. 24, 2011

(87) PCT Pub. No.: WO2010/123094
PCT Pub. Date: Oct. 28, 2010

(65) Prior Publication Data
US 2012/0045580 A1   Feb. 23, 2012

(30) Foreign Application Priority Data

Apr. 24, 2009   (JP) .................................. 2009-106136

(51) Int. Cl.
*B01D 69/08* (2006.01)
*B01D 67/00* (2006.01)
(Continued)

(52) U.S. Cl.
CPC ....... *B01D 69/087* (2013.01); *B01D 67/0016* (2013.01); *B01D 69/08* (2013.01);
(Continued)

(58) Field of Classification Search
CPC .................................................. B01D 69/087
(Continued)

(56) References Cited

U.S. PATENT DOCUMENTS 3,619,257 A * 11/1971 Fukada et al. ................ 427/246
4,824,569 A   4/1989 Suzuki et al.
(Continued)

FOREIGN PATENT DOCUMENTS

CN   1140769 A   1/1997
CN   1556833 A   12/2004
(Continued)

OTHER PUBLICATIONS

International Search Report issued Jun. 8, 2010 in PCT/JP10/057225 filed Apr. 23, 2010.
(Continued)

*Primary Examiner* — Alex A Rolland
(74) *Attorney, Agent, or Firm* — Oblon, McClelland, Maier & Neustadt, L.L.P.

(57) ABSTRACT

Disclosed is a method for manufacturing a composite porous film having a stable film quality and a desired hollow shape by controlling the entrance of a film-forming resin solution into a hollow part of a hollow reinforcement support. The method is provided with a step of adhering a film-forming resin solution to the outer peripheral surface of the hollow reinforcement support and thereby forming a film intermediate, a step of adhering a coagulating liquid to the outer peripheral surface of the film intermediate, and a step of flowing the coagulating liquid along the outer peripheral surface of the film intermediate so that at least a part of the outermost interface of the coagulating liquid in the circumferential direction is a free surface and thereby coagulating the film-forming resin solution adhering to the outer peripheral surface of the hollow reinforcement support.

15 Claims, 3 Drawing Sheets

(51) Int. Cl.
   *B01D 69/10*   (2006.01)
   *B01D 71/34*   (2006.01)
   *C02F 1/44*    (2006.01)

(52) U.S. Cl.
   CPC ............. *B01D 69/10* (2013.01); *B01D 71/34* (2013.01); *B01D 2323/42* (2013.01); *B01D 2325/40* (2013.01); *C02F 1/444* (2013.01)

(58) Field of Classification Search
   USPC ........................................................ 427/246
   See application file for complete search history.

(56) References Cited

U.S. PATENT DOCUMENTS

| | | | |
|---|---|---|---|
| 5,064,580 | A | 11/1991 | Beck et al. |
| 5,158,636 | A | 10/1992 | Groitzsch et al. |
| 5,213,689 | A | 5/1993 | Kafchinski et al. |
| 5,514,413 | A * | 5/1996 | Van't Hof et al. ............ 427/244 |
| 5,868,985 | A * | 2/1999 | Frischmann ............. D01F 2/00 264/180 |
| 5,871,680 | A | 2/1999 | Macheras et al. |
| 7,081,273 | B2 * | 7/2006 | Ji .................................. 427/296 |
| 7,258,914 | B2 | 8/2007 | Morikawa et al. |
| 7,501,084 | B2 | 3/2009 | Wossenkaul et al. |
| 2003/0232184 | A1 | 12/2003 | Morikawa et al. |
| 2005/0202182 | A1 | 9/2005 | Vossenkaul et al. |
| 2006/0000766 | A1 | 1/2006 | Ji |
| 2007/0084794 | A1 | 4/2007 | Morikawa et al. |
| 2009/0206026 | A1 | 8/2009 | Yoon et al. |

FOREIGN PATENT DOCUMENTS

| | | |
|---|---|---|
| EP | 0 175 948 A2 | 4/1986 |
| EP | 0 407 684 A1 | 1/1991 |
| EP | 0 334 998 B1 | 11/1992 |
| EP | 0 750 937 A2 | 1/1997 |
| JP | 61 064304 | 4/1986 |
| JP | 8 229358 | 9/1996 |
| JP | 9 010563 | 1/1997 |
| JP | 2005 220202 | 8/2005 |
| JP | 2008 126199 | 6/2008 |
| WO | WO 03/076055 A1 | 9/2003 |
| WO | WO 2004/009221 A1 | 1/2004 |

OTHER PUBLICATIONS

Combined Office Action and Search Report issued Aug. 27, 2013 in Chinese Application No. 201080017944.X.

Combined Taiwanese Office Action and Search Report issued Mar. 15, 2013, in Taiwanese Patent Application No. 099112845 with English translation of category of cited Documents.

Japanese Office Action issued Feb. 3, 2014 in Patent Application No. 2010-519304.

Extended Search Report issued Sep. 19, 2013 in European Patent Application No. 10767149.7.

Office Action issued May 28, 2014 in Canadian Patent Application No. 2,759,639.

* cited by examiner

METHOD FOR MANUFACTURING A POROUS COMPOSITE MEMBRANE

TECHNICAL FIELD

The present invention relates generally to a method for manufacturing a porous composite membrane, and more specifically to a method for manufacturing a thread-shaped porous composite film using a hollow reinforcing support body.

TECHNICAL BACKGROUND

Long, finely shaped porous composite membranes using synthetic fibers or the like as a base material have been widely used in water treatment and other fields.

A porous composite membrane manufacturing method has been proposed whereby multiple types of coagulating solution are brought into contact with hollow fibers at the initial spinning stage in an opposing flow within a column, the top portion of which is under reduced pressure (Patent Citation 1).

A porous composite membrane manufacturing method has also been proposed in which a membrane-manufacturing raw material solution is coated onto a hollow support body, and this support body, mediated by a guide roll, and passed through a coagulating bath containing a coagulating solution, thereby causing the solution of the raw material for manufacturing the membrane to coagulate (Patent Citation 2).

LIST OF PRIOR ART DOCUMENT

Patent Document

Patent Document 1: Japanese Patent Unexamined Publication H9-10563
Patent Document 2: Japanese Patent Unexamined Publication 2008-126199

SUMMARY OF THE INVENTION

Problems to be Solved by the Invention

However, because the vapor phase portion in the top area of the column in the method of Patent Document 1 is under negative pressure, the pressure inside the hollow portion of the hollow reinforcing support bodies may be higher than the vapor phase portion at the top of the column when hollow reinforcing support bodies are supplied from outside the column. In such cases, vapor inside the hollow portion may be caused by the pressure differential to blow out from the hollow reinforcing support body, causing the membrane-forming resin solution adhered in layers on the hollow reinforcing support bodies to expand, leading to the problem that the hollow fiber membrane having desired shape, can no longer be obtained.

No particular consideration is given to the degree of penetration of the membrane-forming resin membrane into the hollow reinforcing support body.

In Patent Document 2, raising the conveyance speed of the support body to improve productivity causes coagulation of the membrane-forming raw material solution to occur at a deeper position within the coagulating bath. As a result, the membrane-forming raw material solution is pressed into the hollow portion of the support bodies by fluid pressure due to water depth, leading to problems such as blockage of the hollow portion, making the desired hollow shape unobtainable.

Another problem is that even when the hollow support bodies have a structure permitting easy penetration of membrane-forming raw material solution into their interior, the membrane-manufacturing raw material solution blocks the hollow portion, making the desired hollow shape unobtainable.

The present invention was undertaken to resolve the aforementioned problems, and therefore provides a porous composite membrane capable of attaining a stable membrane quality and desired hollow shape by controlling the penetration of membrane-forming resin solution into the hollow portion of a hollow reinforcing support body.

Means for Solving the Problems

According to the present invention, a method for manufacturing a porous composite membrane comprising:

a step for adhering a membrane-forming resin solution to the outer circumferential surface of a hollow reinforcing support body to result in a membrane intermediate;

a step for adhering a coagulating solution to the outer circumferential of the membrane intermediate;

and a step for coagulating the membrane-forming resin solution adhered to the outer circumferential surface of the hollow reinforcing support body as coagulating solution is caused to flow along the outer circumferential surface of the hollow reinforcing support body in such a way that at least a portion in the circumferential direction of the outermost boundary surface of the coagulating solution is treated as a free surface.

In the "step for coagulating a membrane-forming resin solution adhered to the outer circumferential surface of a hollow reinforcing support body while flowing the coagulating solution" in the process by which a membrane-forming resin solution is coagulated according to the above-described constitution, almost no external pressure is applied to the membrane-forming resin solution adhered to the outer circumferential surface of the intermediate body, therefore penetration of the membrane-forming resin solution into the hollow reinforcing support body by external pressure in this process is restrained. Thus in this process the required membrane-forming resin solution coagulating time can be fully assured while penetration of membrane-forming resin solution is restrained.

The degree of penetration by the membrane-forming resin solution into the hollow reinforcing support body can also be controlled by adjusting the external pressure applied to the membrane-forming resin solution in the "step for adhering coagulating solution."

In another preferred embodiment of the present invention, the membrane intermediate is transported in the vertical direction during the step for coagulating the coagulating solution.

In another preferred embodiment of the present invention, the coagulating solution is supplied from a portion or from the entire circumference of the intermediate body in the adhesion step.

Supplying coagulating solution to the membrane intermediate refers to supplying coagulating solution to the outermost boundary surface of the membrane intermediate as the membrane intermediate body is traveling.

Supplying from a portion of the circumferential direction refers to supplying from a portion of the circumferential direction, i.e. from only a specific direction relative to the 360 degree circumferential direction in a section orthogonal to the direction in which the membrane intermediate is traveling; the specific direction may be the same direction at all times, or may be changed as needed. There can be one or multiple supply positions, and there can be multiple locations at differing positions along the traveling direction.

Furthermore, supplying from the entire circumference refers to supplying from a 360° direction relative to the 360° circumferential direction in a section orthogonal to the traveling direction of the membrane intermediate.

In another preferred embodiment of the present invention, the hollow reinforcing support body is either a hollow knitting thread, a hollow twining thread, or a hollow fiber membrane.

Effect of the Invention

The present invention provides a method for manufacturing a porous composite membrane capable of obtaining a stable membrane quality and desired hollow shape by controlling the penetration of a membrane-forming resin solution into the hollow portion of the hollow reinforcing support body.

EMBODIMENTS FOR CARRYING OUT THE INVENTION

Below we will discuss a method for manufacturing a porous composite membrane in a preferred embodiment of the present invention.

Porous composite membrane refers to a porous membrane compositely spun so that a continuous membrane-forming resin solution layer is formed (composited) in the circumferential and longitudinal directions on the outermost surface in a lateral section of an elongated hollow reinforcing support body. Porous composite membranes include structures in which a portion of the membrane-forming resin solution penetrates the hollow reinforcing support body after composite spinning, and structures in which there is no penetration. When consideration is given to post-coagulation adhesion between the hollow reinforcing support body and the membrane-forming resin, the structure in which a portion of the membrane-forming resin solution penetrates the hollow reinforcing support body is preferable.

The membrane-forming resin solution used in composite sinning allows for a structure in which a single membrane-forming resin layer is formed, or for a structure in which multiple membrane-forming resin layers are formed. When multiple membrane-forming resin layers are formed, the compositions of the membrane-forming resins of which the various membrane-forming resin layers are comprised may be the same or different, and may be appropriately selected according to the desired membrane structure, shape, and the like.

The method for manufacturing a hollow porous membrane comprises, for example, (i) through (iv) below.

(i) A process for coating a membrane-forming resin solution onto the outermost circumferential surface of a hollow reinforcing support body.

(ii) A process for forming a porous membrane layer by coagulating membrane-forming resin solution coated on a hollow reinforcing support body to obtain a porous composite membrane.

(iii) A process for removing unnecessary components from a porous composite membrane.

(iv) A process for drying a porous composite membrane.

Figure 1:
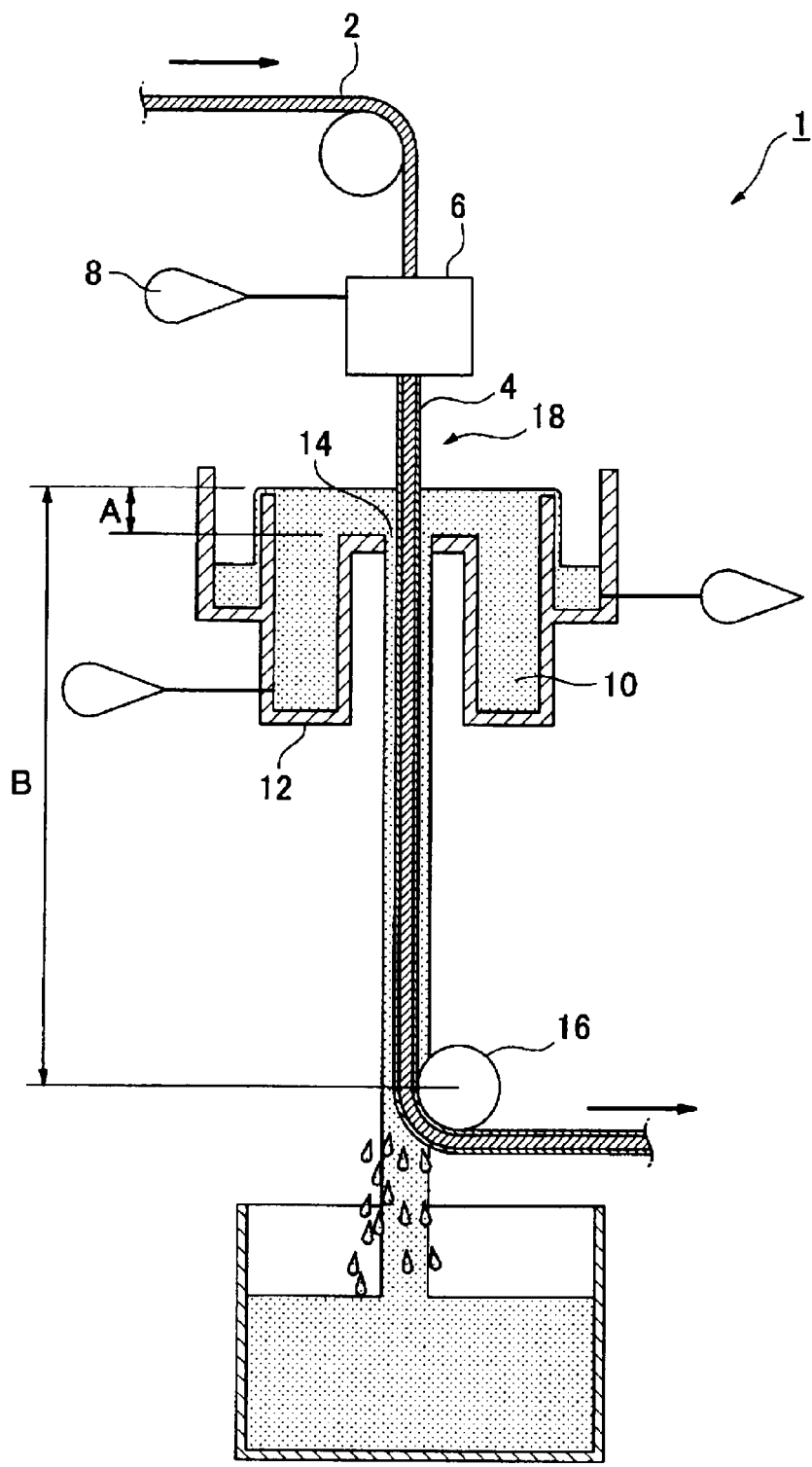
FIG. 1: A schematic cross section view showing a summary of a porous composite membrane manufacturing device for implementing an embodiment of the present invention.

FIG. 1 is a schematic cross sectional view showing a summary of the porous composite membrane manufacturing device 1 used in processes (i)-(ii) which form an embodiment of the present invention. The porous composite membrane manufacturing device 1 comprises an annular nozzle 6 for adhering membrane-forming resin solution 4 continuously onto the outer circumferential surface of an elongated, cylindrical hollow reinforcing support body 2, continuously supplied from a porous composite membrane supply device (not shown); a resin solution supply device 8 for supplying membrane-forming resin solution 4 to the annular nozzle 6; a coagulating bath 12 containing the membrane-forming resin solution 4 coagulating solution 10; an orifice portion 14 provided at the bottom portion of the coagulating bath 12, and a guide 16 for changing the traveling direction of a membrane intermediate.

The hollow reinforcing support body 2 used in the present embodiment is a known elongated, hollow, cylindrical reinforced support body generally used in the manufacture of porous composite membranes, wherein one or more hollow portions continuous in the longitudinal direction are furnished on a section perpendicular to the longitudinal direction, and wherein the interior may be of any structure permitting fluid to move in the longitudinal and thickness directions.

A circular, odd-shape, or other shape is acceptable as the cross-sectional shape of the hollow reinforcing support body, but an annular shape such as that in the embodiment is preferred from the standpoint of pressure-resistance, shaping difficulty, and the like.

Various types of hollow thread membranes, or hollow knitting threads and twines, manufactured of various crimped or non-crimped fibers, are used as hollow reinforcing support bodies of this type.

Support bodies of this type have stitches or other gaps in their wall surfaces, so there is a tendency for membrane-forming resin to penetrate into hollow portions of the reinforced support body from gaps of relatively large dimensions, in addition to the penetration of membrane-forming resin solution caused by surface tension, but these support bodies are suited to the method of the present embodiment, in which there is a reduction of external force caused by water pressure. Structures are also used in which porous membranes are formed on the outside circumferential surface of a hollow reinforcing body such as that described above, or coated with membrane-forming supplemental solution, etc.

In addition, various other fibers and other support bodies used in separation membranes and the like can be utilized. The material forming the support bodies may be a single material or a combination of multiple types.

Among the fibers used as hollow yarns or twines, examples of synthetic fibers include various polyamide-based fibers such as nylon 6, nylon 66, and aromatic polyamide; various polyester-based fibers such as polyethylene terephthalate, polybutylene terephthalate, polylactic acid, and polyglycolic acid; various acrylic-based fibers such as polyacrylonitrile; various polyolefin-based fibers such as polyethylene and polypropylene; various polyvinyl alcohol-based fibers; various polyvinylidene chloride-based fibers; various polyvinyl chloride-based fibers; various polyurethane-based fibers; phenol fibers, fluorine-based fibers formed of fluorinated polyvinylidene fluoride, polytetrafluoroethylene and the like, and various polyalkylene oxybenzoate-based fibers.

Examples of semi-synthetic fibers include various types of cellulose derivative fibers using cellulose diacetate, cellulose triacetate, chitin, chitosan, or the like as a raw material, as well as various types of protein fibers referred to as promix fibers.

Examples of recycled fibers include various cellulose recycled fibers obtained by the viscose method, the copper-ammonia method, or the organic solvent method, and more specifically rayon, cupra, polynosic, and the like.

Among these, polyester fibers, acrylic fibers, polyvinyl alcohol fibers, polyamide fibers, and polyolefin fibers are preferred from the standpoint of chemical resistance, and acrylic fibers are particularly preferred.

There is no particular limitation on the outer diameter of the hollow reinforcing support body 2; for example, 0.3 mm to 5 mm is desirable. Fluctuations in the outer diameter of the hollow reinforcing support body 2 affect quality, in particular with respect to spinning stability, membrane thickness, and the like, so it is desirable that these fluctuations be as small as possible. For example, if the outer diameter is 0.3 mm to 5 mm, a range of fluctuation in the outer diameter of 10% or less is preferred.

A conduit passing through the hollow reinforcing support body 2 is formed at the center of the annular nozzle 6. An annular discharge outlet for discharging membrane-forming resin solution is formed outside the position at which the conduit passes through the hollow reinforcing support body 2.

The porous composite membrane manufacturing device 1 is constituted so that membrane-forming resin solution 4 supplied to the annular nozzle 6 from the resin solution supply device 8 is discharged from the discharge outlet to form a membrane-forming resin solution 4 coating membrane of a predetermined thickness on the outside circumferential surface of the hollow reinforcing support body 2 which passes through the conduit.

Thus, by passing through the annular nozzle 6, the hollow reinforcing support body 2 becomes a membrane intermediate 18 on the outside circumferential surface of which a coating membrane of membrane-forming resin solution 4 is formed; i.e., a membrane-forming resin solution is combined on the hollow reinforcing support body.

There is no particular limitation on the membrane-forming resin used for the membrane-forming resin solution utilized in the present embodiment so long as it is a membrane-forming resin capable of forming a porous hollow thread membrane using a wet or dry spinning method. For example, polysulfone resins such as polysulfone and polyether sulfone, polyacrylonitrile, cellulose derivatives, and fluoride resins such as polyvinylidene fluoride, polyamide, polyester, polymethacrylate, polyacrylate, and the like are preferred. Copolymers of these resins or partially-substituted versions thereof are also acceptable. A mixture of two or more resins is also acceptable.

There is no particular limitation on the solvent used for the membrane-forming resin utilized in the present embodiment so long as it is capable of dissolving a membrane-forming resin. For wet and dry spinning, a substance capable of uniform mixing with water is preferred, given that it will be wet absorbed into the membrane-forming resin solution at the free traveling portion; examples include N,N-dimethylformamide, N,N-dimethylacetamide, dimethyl sulfoxide, N-methyl-2-pyrrolidone, N-methylmorpholine-N-oxide, and the like.

The membrane-forming resin solution used in the present embodiment is obtained by uniformly dissolving 10-30 mass %, and preferably 15-25 mass % of membrane-forming resin solution into a solvent. When so doing, hydrophilic polymers such as polyvinyl pyrrolidone, polyethylene glycol, polyvinyl acetate and polyvinyl alcohol, non-solvents such as water or alcohol, or inorganic salts may be added as additives to control phase separation. When using additives, a concentration of 1-20 mass % is preferred; more preferable is 5-12 mass %.

Viscosity is preferably from 20,000 to 500,000 m Pa sec viscosity at 40° C., and more preferably from 40,000 to 200,000 m Pa sec, and even more preferably from 70,000 to 150,000 m Pa sec.

A coagulating bath 12 housing the coagulating solution 10 for coagulating the membrane-forming resin solution 4 coated on the hollow reinforcing support body 2 to form a porous membrane layer is disposed on the downstream side of the annular nozzle 6 in the direction of transport of the membrane intermediate 18. The coagulating bath 12 opens upward, and an orifice portion 14 through which the membrane intermediate 18 can pass is formed on the bottom portion thereof.

For wet and dry spinning, a free traveling portion is provided between the annular nozzle 6 and the coagulating bath 12.

The pore diameters of the porous membrane are adjusted by wet absorption of the membrane-forming resin solution in the free-traveling portion.

The porous composite membrane manufacturing device 1 is constituted so that the membrane intermediate 18 which has passed through the annular nozzle 6 is introduced from the upper opening of the coagulating bath 12 into the coagulating solution 10 contained within the coagulating bath 12, and is removed from the coagulating bath 12 through the orifice portion 14 at the bottom portion thereof. The membrane intermediate 18 contacts the coagulating solution 10 by virtue of passing through the coagulating solution 10 contained in the coagulating bath 12, such that the coagulating solution 10 is adhered to its outside circumferential surface.

The orifice portion 14 is constituted such that the membrane intermediate can pass through it, and coagulant fluid can be flowed along the outside circumferential surface of the membrane intermediate 18 passing through the coagulating bath 12. The dimensions and shape of the orifice portion 14 are determined as appropriate according to the outer diameter and membrane manufacturing conditions, etc. of the hollow reinforcing support body. For example, the orifice can have a circular or rectangular shape.

Furthermore, a member furnished with a downward-tapering funnel-shaped part and an elongated cylindrical portion attached to the end of the funnel-shaped part is provided at the bottom portion of the coagulating bath 12; an opening at the bottom end of the cylindrical portion is used as the orifice portion 14, and the membrane intermediate 18 is passed through this orifice portion 14 and guided to the outside.

The present embodiment may be constituted so that a single orifice portion 14 is provided for a single membrane intermediate 18, or so that a single orifice is provided for multiple membrane intermediate bodies 18.

For example, when an orifice portion 14 with a thickness of 3 mm in the membrane intermediate traveling direction is passed through a single membrane intermediate 18, assuming a membrane outer diameter of 1 to 6 mm and a coagulating solution depth of 10 mm, an orifice diameter from 8 to 15 mm is preferred.

The porous composite membrane manufacturing device 1 coagulating bath 12 is constituted to control the depth (coagulating solution depth A) of the coagulating solution inside the coagulating bath 12, which is to say the contact length B of the membrane intermediate 18 with the coagulating solution in the coagulating bath (the length over which the coagulating solution is supplied to the membrane intermediate).

The external pressure applied to the membrane-forming resin solution 4 coated onto the hollow reinforcing support body 2 can be adjusted by changing the coagulating solution depth A.

The coagulating solution used in the present embodiment is a fluid which reduces the solvent concentration in the membrane-forming resin solution contained in the membrane intermediate 18 to change the phase of either part or all of the membrane-forming resin to a solid; there is no particular limitation as to the type thereof.

Water, which has superior workability and coagulating power, or an aqueous solution containing the solvent used for the membrane-forming resin solution, are preferred. For example, when using N,N-dimethyl acetamide as the membrane-forming resin solution solvent, a dimethyl acetamide concentration of 70% or below is preferred. Over 70%, the diffusion of the solvent into the coagulating solution declines, the membrane intermediate coagulating time is delayed, and deformation or breakdown of the membrane arises at the guide, etc. where first contact is made after contact with the coagulating solution, leading to the possibility that the desired membrane will become unobtainable. More preferably, the concentration is 50% or less, and even more preferably 30% or less.

A guide 16 is provided vertically below the orifice portion 14, and the membrane intermediate 18 which passes through and is conveyed out of the orifice portion 14 is carried vertically downward toward the guide 16. At this point, the membrane intermediate 18 which has passed through the coagulating solution 10 is arranged so that the coagulating solution adhered to the outside circumferential surface thereof flows along that outside circumferential surface. Causing coagulating solution to flow along the membrane intermediate 18 refers to causing it to flow in the longitudinal direction of the outside surface of the membrane intermediate 18 so that a part or all of the outside circumferential of the membrane intermediate contacts the coagulating solution. The outermost boundary surface of the coagulating solution flowing on the outside circumferential surface of the membrane intermediate 18 contacts air under atmospheric pressure and forms a free surface.

In the porous composite membrane manufacturing device 1, the guide 16 comprises a rotatably attached rotating guide roller, but any form, such as a fixed guide, is acceptable so long as it does not damage the membrane intermediate 18 by a rubbing motion.

The traveling direction of the membrane intermediate may be inclined so long as there is no effect imparted on external forces such as fluid pressure which can cause penetration of the coagulating fluid or membrane-forming resin solution into the hollow portion.

Causing at least a portion of the coagulating solution in the circumferential direction at the outermost boundary surface to serve as a boundary surface for releasing external forces imparted from the coagulating solution, i.e., as a free surface, controls the fluid pressure of the coagulating solution, i.e. the static pressure or fluid resistance of the coagulating solution which becomes an external force causing the membrane-forming resin solution combined onto the membrane intermediate to penetrate from the outer surface into the hollow portion.

A free surface should be provided in at least a portion of the circumferential direction, which is a section perpendicular to the direction in which the coagulating solution flows. This free surface normally contacts a gas, and the coagulating solution has much lower traveling resistance when it moves compared to contact with a solid surface such as a tubular body or the like.

When the boundary surface with the coagulating solution is a closed solid surface such as a pipe, as in flow pipe spinning, an external force arises on the outside circumference of the membrane intermediate due to the fluid resistance arising between the coagulating solution and the solid surface. This external force causes the membrane-forming resin solution to penetrate into the hollow portion of the hollow reinforcing support body. When the pipe or the like is long, there is also an effect imparted by static pressure due to the coagulating solution depth.

In the present embodiment the membrane intermediate 18 is constituted to be conveyed vertically downward in the air between the coagulating bath 12 and the guide 16, but a structure is also acceptable in which the membrane intermediate is conveyed together with the coagulating solution inside a tubular body having a shape which in section is open in one portion to the outside, as in a tubular body with a C-shaped cross section.

Note that when the membrane intermediate 18 is conveyed vertically downward in air, it is sufficient that it be conveyed approximately vertically downward; when the tensile force arising from air resistance or the annular nozzle 6, the guide 16, or the like are taken into consideration, it may be inclined a few degrees (e.g., approximately 2 to 5°) relative to plumb.

Furthermore, as described above, a cylindrical portion is provided on the bottom portion of the coagulating bath 12, and in cases such as when the opening at the bottom end of this cylindrical portion is used as the orifice portion 14, it is acceptable for the membrane intermediate 18 to be conveyed at an incline relative to plumb. In that instance, it is preferable to set the angle of inclination at 30° or less relative to the plumb direction, as this permits easy adjustment of the time in contact with the coagulating solution.

In the porous composite membrane manufacturing method of the present embodiment, the membrane-forming resin solution 4 is caused to adhere to the outside circumferential surface of the hollow reinforcing support body 2 by the porous composite membrane manufacturing device 1, resulting in the membrane intermediate 18. The membrane intermediate 18 is then passed through the coagulating bath 12, coagulating solution 10 is caused to adhere to the outside circumferential surface of the membrane intermediate 18 and, by conveying the membrane intermediate vertically downward, the membrane-forming resin solution 4 is caused to coagulate as the coagulating solution is flowed along the outside circumferential surface of the membrane intermediate. Here, in the step in which contact is made with the coagulating solution flowing, at least a portion in the circumferential direction at the outermost boundary of the coagulating solution is deemed a free surface.

In the manufacturing method described above, the coagulating solution flows downward along the outside circumferential surface of the membrane intermediate due to gravity, therefore the coagulating solution movement speed increases by lengthening the flow distance, and surface renewal of the membrane intermediate is promoted. Additionally, because the fluid resistance arising between the falling coagulating solution and the membrane intermediate becomes a propulsive force causing the membrane intermediate to travel downward, an increase in the coagulating solution drop distance results in a diminution of the contact force on the guide, etc. first contacted by the membrane intermediate; the weight of the membrane intermediate itself also becomes capable of contributing to the same effect, so that a reduction in membrane deformation caused by guide contact can be expected. This is also preferable from the standpoint of promoting coagulation, and because the boundary surfaces in the circumferential direction and longitudinal direction of the coagulating solution outermost boundary surface can be treated as free surfaces, this is also preferable from the standpoint of uniform of the coagulating solution surface.

It is possible in the above-described method for the coagulating solution depth A and the coagulating solution contact length B to be separately adjusted, therefore it is possible to reduce the coagulating solution depth A and lengthen the coagulating solution contact length B without increasing coagulating solution pressure, which affects the penetration of membrane-forming resin solution into the hollow portion of the membrane intermediate; penetration into the hollow portion can thus be easily controlled.

Also, because the coagulating solution contact length B is basically the portion in which the coagulating solution is caused to flow, the coagulating solution contact length B can be easily changed by changing the distance between the coagulating bath 12 and the guide 16, making this a superior method from an equipment and handling standpoint.

After the membrane-forming resin solution is brought into contact with the coagulating solution, the membrane-forming resin solution hardens and its structure becomes fixed, therefore it is preferable to avoid as much as possible any contact between the membrane intermediate and the guide, etc.

A range of 0-500 mm for the coagulating solution depth A and 200-3000 mm for the coagulating solution contact length B is preferred.

Porous composite membranes formed in this way generally have large pore diameters and potentially high water permeability, but unnecessary components remain in the membrane. Therefore after the coagulating process it is preferable to pass through a process for removing unnecessary components remaining in the membrane.

As an example of the present embodiment, a process for removing unnecessary components is provided on the downstream side of the guide 16.

Solvents and additives (e.g., hydrophilic polymers) remain in solution in the membrane (the porous portion) of the porous composite membrane obtained by the coagulating process. Such solvents and hydrophilic polymers are, up to a point, relatively easily removed by immersing the porous composite membrane in a cleaning fluid.

Therefore the porous composite membrane is first immersed in cleaning fluid. Next, using an oxidant, a method is employed whereby cleaning of the hydrophilic polymer to a desired level is carried out primarily by reducing the molecular weight of the hydrophilic polymer.

Hydrophilic polymers remain in a high concentration solution state in the membrane (the porous portion) of the porous composite membrane obtained by the coagulating process. Such high concentration hydrophilic polymers are, up to a point, relatively easily removed by immersing the porous composite membrane in a cleaning fluid.

Therefore as a preparatory process, the porous composite membrane is first immersed in cleaning fluid. Next, as the main process, a method is employed using an oxidant whereby cleaning of the hydrophilic polymer is carried out primarily by reducing the molecular weight of the hydrophilic polymer.

Finally, a porous composite membrane is obtained after passing through a process for drying the porous composite membrane. There is no particular limitation with respect to the method for drying; a method may be mentioned, for example, in which the porous composite membrane is introduced into a drying device such as a hot air dryer.

Figure 2:
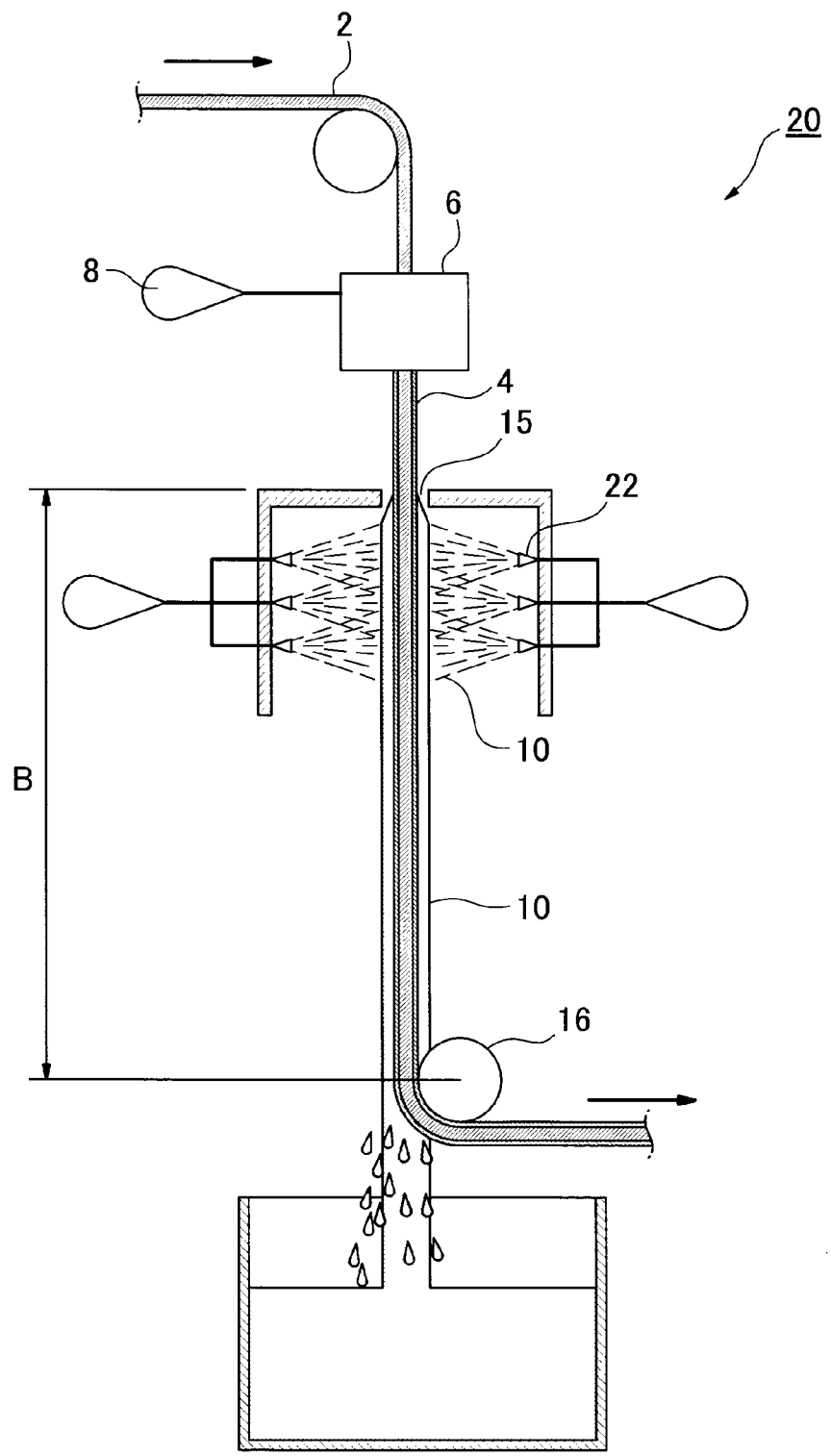
FIG. 2: A schematic cross section view showing a summary of a porous composite membrane manufacturing device for implementing another embodiment of the present invention.

Next we discuss a porous composite membrane manufacturing device according to a second embodiment of the present invention, used in processes (i)-(ii) above. FIG. 2 is a sectional diagram showing a summary of the second embodiment porous composite membrane manufacturing device. Note that the same reference numerals are assigned to those elements which are the same as the first embodiment porous composite membrane manufacturing device 1, and an explanation thereof is omitted.

The reformer 20 is furnished with: an annular nozzle 6 for continuously coating a membrane-forming resin solution 4 onto a hollow reinforcing support body 2 continuously supplied from a hollow reinforcing support body supply device (not shown); a resin solution supply device 8 for supplying the membrane-forming resin solution 4 to the annular nozzle 6; a shower 22 for bringing into contact with and supplying to the membrane intermediate a coagulating solution 10 for coagulating the membrane-forming resin solution 4 coated onto the hollow reinforcing support body 2; and a guide 16 for changing the travel direction of the porous composite membrane.

In addition to the method whereby supply is carried out by a shower or spray nozzle or the like, methods for adhering coagulating solution to a traveling membrane intermediate include a method for heating the coagulating solution and passing the membrane intermediate through the generated hot vapor; a method for forcibly supplying steam to the membrane intermediate as it is conveyed; and a method for causing the membrane intermediate to travel through solution droplets created by a carburetor or vaporizer utilizing a venturi, or by an ultrasonic atomizer or the like.

Additional methods include that in which coagulating solution is discharged in the direction of travel of the membrane intermediate from a ring-shaped slit as it is caused to travel downward; and a method in which an annular slit for supplying coagulating solution is provided at a position circumferentially further out than the nozzle annular slit portion which spins out membrane-forming resin solution, thereby supplying the coagulating solution in a cylindrical form.

These coagulating solution supply methods are used individually or in combination.

When coagulating solution is in this manner brought into contact with a membrane intermediate in a vapor or mist form, there is a possibility that the coagulating solution will spray out toward the annular nozzle 6; a partition having an opening portion 15 may be provided as needed between the coagulating solution supply portion and the annular nozzle 6 in order to prevent spraying out, or to establish zones, etc.

The present invention is not limited to the above-described embodiments, and may be variously changed or revised within the scope of the technical concepts set forth in the Claims.

EXAMPLE

The present invention is explained in detail below based on examples.

1) Manufacture of a Hollow Reinforcing Support Body

Based on the conditions shown in Table 1, a polyester fiber (5 kg wound bobbin) was wound and supplied to a table-top winding machine (manufactured by Marui Textile Machinery, Inc.; 12 knitting needles; 16 gauge needle size; knitting needle circumferential diameter: 8 mm), then passed through a heating die to obtain a hollow reinforcing support body.

TABLE 1

|  | Hollow reinforcing Support Body | | | | |
| --- | --- | --- | --- | --- | --- |
|  | A | B | C | D | E |
| Reinforced Support Body Type | Knitting Thread | Knitting Thread | Knitting Thread | Knitting Thread | Knitting Thread |
| Raw Thread Fiber (dtex) | 84 | 84 | 84 | 84 | 84 |
| Raw Thread Material | PET | PET | PET | PET | PET |
| No. of Twisted Threads | 5 | 4 | 4 | 6 | 5 |
| Die Entry Diameter (mm) | 5 | 5 | 5 | 5 | 5 |
| Die Exit Diameter (mm) | 2.5 | 2.2 | 2.3 | 3 | 2.5 |
| Die Length (mm) | 300 | 300 | 300 | 300 | 300 |
| Die Temp. (° C.) | 200 | 195 | 215 | 220 | 210 |
| Take Up Speed (m/hr) | 100 | 100 | 100 | 100 | 270 |
| Knitting Thread Outer Dia. (mm) | Approx. 2.5 | Approx. 2.2 | Approx. 2.3 | Approx. 2.9 | Approx. 2.5 |
| No. of Stitches/Rotation | 12 | 12 | 12 | 12 | 12 |
| No. of Stitches in Longitudinal Direction (stitches/inch) | Approx. 26 | Approx. 23 | 28 | 33 | Approx. 24 |

2) Adjusting the Membrane-Forming Resin Solution

Polyvinylidene fluoride (manufactured by Arkema, product name Kynar 301F), polyvinylidene fluoride B (manufactured by Arkema, product name Kynar 9000LD), polyvinyl pyrrolidone A (manufactured by ISP, product name K-90), polyvinyl pyrrolidone B (manufactured by Nippon Shokubai, product name K-79), and N,N-dimethyl acetoamide were respectively mixed and dissolved in the mass ratios shown in Table 2, to prepare a membrane-forming resin solution.

TABLE 2

| Composition (Mass %) | Membrane-Forming Resin Solution A | Membrane-Forming Resin Solution B | Membrane-Forming Resin Solution C |
| --- | --- | --- | --- |
| Polyvinylidene fluoride A | 12 | 11.8 | 19.2 |
| Polyvinylidene fluoride B | 8 | 11.8 |  |
| Polyvinyl pyrrolidone A | 10 |  |  |
| Polyvinyl pyrrolidone B |  | 11.8 | 10.1 |
| N,N-dimethyl acetoamide | 70 | 64.7 | 70.7 |
| Membrane-forming resin solution temperature (° C.) | 60 | 60 | 60 |
| Concentration of polyvinylidene fluoride in membrane-forming resin solution (mass %) | 20 | 23.6 | 19.2 |

Examples 1-11

The hollow reinforcing support body shown in Table 1 was supplied to a center hole in the annular nozzle, and the membrane-forming resin solution shown in Table 2, temperature-controlled to 32° C., was supplied to an annular slit in an annular nozzle with an outside diameter of 5.3 mm and inside diameter of 4.5 mm, then ejected in the vertical downward direction so as to be annularly laminated onto the hollow reinforcing support body. The membrane intermediate obtained by laminated conjugate spinning of the two was passed through a free traveling portion, then passed through a coagulating bath having the coagulating solution depth shown in Tables 3 and 4, and through an orifice portion provided on the bottom of the coagulating bath. At the same time, coagulating solution was also caused to flow from the orifice portion in the vertical downward direction along the membrane intermediate. Dimethylacetamide (DMAc) dissolved in water at the concentration shown in Tables 3 and 4 was used for the coagulating solution. After passing through the orifice, the membrane was caused to travel a fall length (B-A), excluding the coagulating solution depth shown in Tables 3 and 4, with the outer circumference of the coagulating solution in a free surface state. Thereafter the travel direction was changed by the rotating guide, and the membrane was taken up by the take-up roll; unnecessary components were removed and drying implemented to obtain a porous composite membrane.

Example 12

Adhesion of the coagulating solution was performed by showering from a single direction and, except for the fact that the coagulating solution was placed in a free surface state starting from the coagulating solution adhesion, a porous composite membrane was obtained by the same methods as Examples 1 through 12 under the conditions in Tables 1, 2, and 4.

TABLE 3

|  |  | Ex. 1 | Ex. 2 | Ex. 3 | Ex. 4 | Ex. 5 | Ex. 6 |
| --- | --- | --- | --- | --- | --- | --- | --- |
| Spinning Speed | m/min | 8.8 | 8.8 | 8.8 | 8.8 | 8.8 | 8.8 |
| Reinforced Support Body |  | A | A | A | C | A | A |
| Amount of Membrane-Forming Resin Solution (A) Discharged | cm3/min | 23.4 | 23.4 | 23.4 | 23.4 | Approx. 70 | Approx. 70 |

TABLE 3-continued

|  |  | Ex. 1 | Ex. 2 | Ex. 3 | Ex. 4 | Ex. 5 | Ex. 6 |
|---|---|---|---|---|---|---|---|
| Coagulating solution Temp. | °C. | Approx. 70 | Approx. 70 | Approx. 70 | Approx. 70 | 5-10 | 5-10 |
| Coagulating solution DMAc Concentration | Mass % | 5-10 | 5-10 | 5-10 | 5-10 | 23.4 | 23.4 |
| Coagulating solution Depth (A) | mm | 10 | 50 | 90 | 180 | 10 | 10 |
| Orifice Diameter | mm | 8 | 8 | 8 | 5 | 8 | 8 |
| Orifice Length | mm | 3.5 | 3.5 | 3.5 | 15 | 3.5 | 3.5 |
| Coagulating solution Contact Length (B) | mm | 1000 | 1000 | 1000 | 1000 | 700 | 500 |
| Hollow Portion Blockage |  | None | None | None | None | None | None |

TABLE 4

|  |  | Ex. 7 | Ex. 8 | Ex. 9 | Ex. 10 | Ex. 11 | Ex. 12 |
|---|---|---|---|---|---|---|---|
| Spinning Speed | m/min | 8.8 | 8.8 | 8.8 | 20 | 4 | 4 |
| Reinforced Support Body |  | A | A | B | A | D | C |
| Coagulating solution Temp. | °C. | Approx. 70 | Approx. 70 | Approx. 70 | Approx. 70 | 12.84 | 12.84 |
| Coagulating solution DMAc Concentration | Mass % | 5-10 | 5-10 | 5-10 | 5-10 | 15 | 15 |
| Amount of Membrane-Forming Resin Solution (A) Discharged | cm3/min | 23.4 | 23.4 | 23.4 | 53.12 | 0 (water) | 0 (water) |
| Coagulating solution Depth (A) | mm | 10 | 10 | 20 | 20 | 212 | 0 showering |
| Orifice Diameter | mm | 8 | 8 | 10 | 10 | 5 | — |
| Orifice Length | mm | 3.5 | 3.5 | 3.5 | 3.5 | 15 | — |
| Coagulating solution Contact Length (B) | mm | 400 | 300 | 1000 | 1000 | 1160 | 1160 |
| Hollow Portion Blockage |  | None | None | None | None | None | None |

Examples 13-17

A porous composite membrane was obtained using the conditions shown in Tables 1 and 5 by the same methods as in Examples 1-12, except that the membrane-forming resin solution B shown in Table 2, temperature-controlled to 32° C., was supplied from the inner-circumference side of a 5.24 mm outside diameter, 3.4 mm inside diameter annular slit in the annular nozzle; a membrane-forming resin solution C was supplied from the outer circumferential side thereof; and the porous composite membrane was discharged vertically downward so that the membrane-forming resin solution was annularly laminated onto the hollow reinforcing support bodies.

TABLE 5

|  |  | Ex. 13 | Ex. 14 | Ex. 15 | Ex. 16 | Ex. 17 |
|---|---|---|---|---|---|---|
| Spinning Speed | m/min | 10 | 20 | 30 | 40 | 50 |
| Reinforced Support Body |  | E | E | E | E | E |
| Coagulating solution Temp. | °C. | Approx. 75 | Approx. 75 | Approx. 75 | Approx. 75 | Approx. 75 |
| Coagulating solution DMAc Concentration | Mass % | 0-5 | 0-5 | 0-5 | 0-5 | 0-5 |
| Amount of Membrane-Forming Resin Solution (B) Discharged | cm3/min | 15 | 30 | 45 | 60 | 75 |

TABLE 5-continued

|  |  | Ex. 13 | Ex. 14 | Ex. 15 | Ex. 16 | Ex. 17 |
|---|---|---|---|---|---|---|
| Amount of Membrane-Forming Resin Solution (C) Discharged | cm3/min | 11.6 | 23.2 | 34.8 | 46.4 | 58 |
| Coagulating solution Depth (A) | mm | 10 | 10 | 10 | 10 | 10 |
| Orifice Diameter | mm | 10 | 10 | 10 | 10 | 10 |
| Orifice Length | mm | 3.5 | 3.5 | 3.5 | 3.5 | 3.5 |
| Coagulating solution Contact Length (B) | mm | 1010 | 1010 | 1010 | 1010 | 1010 |
| Hollow Portion Blockage |  | None | None | None | None | None |

In each of the Examples 1-17, when a section parallel to the longitudinal direction of the finished porous composite membrane was observed, there was no penetration found by the membrane-forming resin solution, which can obstruct or be a factor in obstructing the hollow portion.

Comparative Examples 1-3

Figure 3:
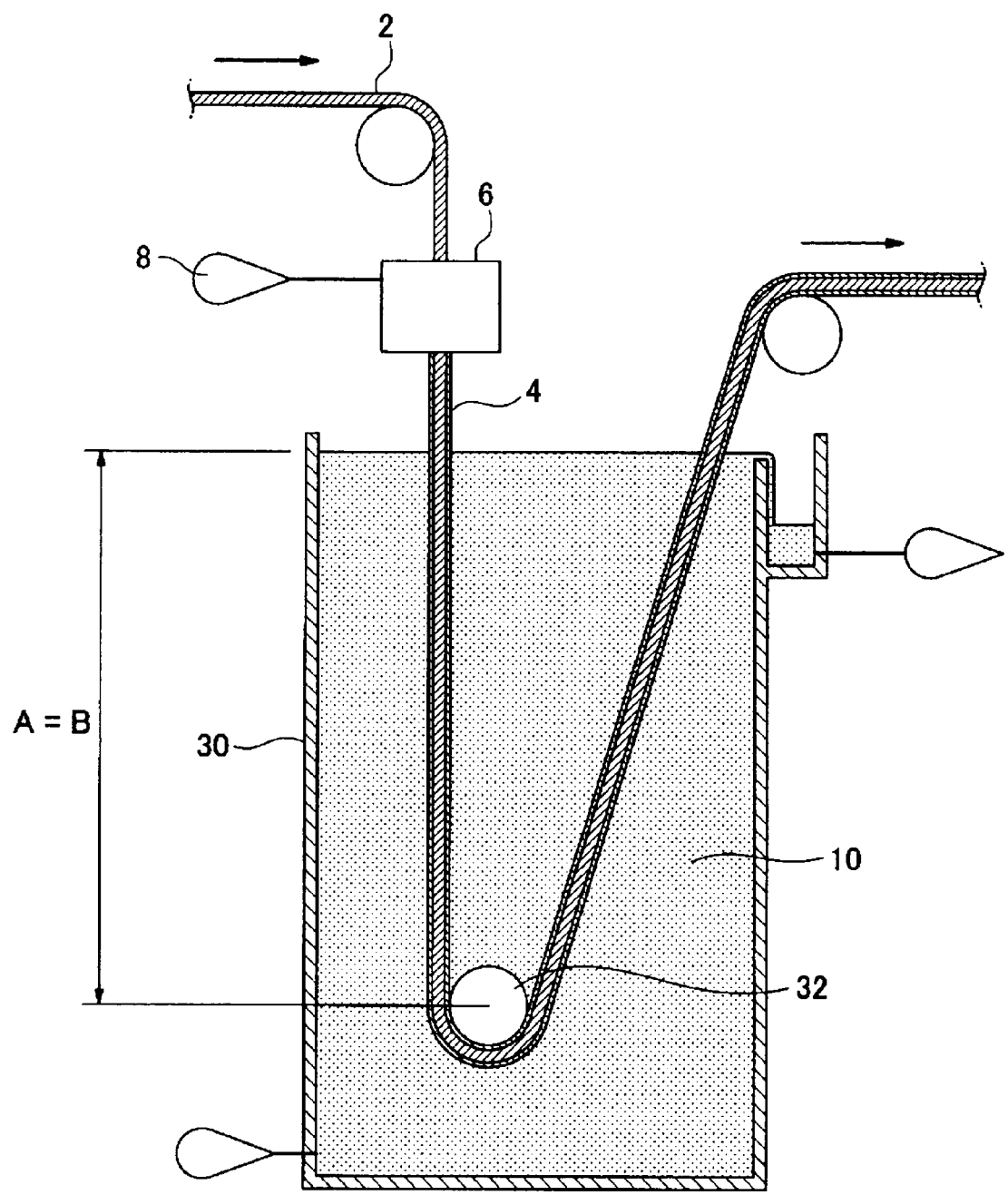
FIG. 3: A schematic cross section view showing a summary of a porous composite membrane manufacturing device for implementing a comparative example of the present invention.

After spinning in the same way as discussed in the examples, the porous composite membrane was directed to the coagulating bath 30 in which the FIG. 3 coagulating solution 10 is held; a rotating guide 32 for changing the traveling direction of the membrane intermediate was provided inside the coagulating bath; the depth from the solution surface in the coagulating bath to the center axis of the rotating guide was deemed to be the coagulating solution depth; the membrane was immersed at the solution depth shown in Table 6, and its traveling direction changed by the rotating guide installed in the coagulating bath, it was then taken up by a take-up roll; unnecessary components were removed, the membrane dried, and a porous composite membrane thus obtained.

TABLE 6

|  |  | Comp. Ex. 1 | Comp. Ex. 2 | Comp. Ex. 3 |
|---|---|---|---|---|
| Spinning Speed | m/min | 4 | 4 | 4 |
| Reinforced Support Body |  | D | D | C |
| Coagulating solution Temp. | ° C. | Approx. 80 | Approx. 80 | Approx. 80 |
| Coagulating solution DMAc Concentration | Mass % | 5-10 | 5-10 | 5-10 |
| Amount of Membrane-Forming Resin Solution Discharged | cm3/min | 12.84 | 12.84 | 10.8 |
| Coagulating solution Depth (A = B) | mm | 1160 | 515 | 1160 |
| Hollow Portion Blockage |  | Yes | Yes | Yes |

In each of the Comparative Examples 1-3, as well, when a section parallel to the longitudinal direction of the finished porous composite membrane was observed, penetration or obstruction of the hollow portion of the membrane-forming resin of the type which can cause obstruction was found.

INDUSTRIAL APPLICABILITY

By enabling separation and independent control of the coagulating solution contact length and the coagulating solution depth, the porous composite membrane of the present invention enables control of the penetration of the membrane-forming resin solution into the hollow portion of the hollow reinforcing support body, while maintaining the coagulating solution contact length. This facilitates manufacturing of membranes onto hollow reinforcing support bodies, which was previously difficult, as well as the elimination of problems with blockage of the hollow portion and equipment adaptation associated with increased speed; a stable membrane quality can thus be obtained, enabling use as a filter membrane for water treatment by precision filtering, ultra-filtration, and the like.

The invention claimed is:

1. A method for manufacturing a porous composite membrane, the method comprising:
    adhering a membrane-forming resin solution to an outside circumferential surface of a hollow reinforcing support body to obtain a membrane intermediate;
    passing the membrane intermediate through a coagulating bath containing a coagulation solution of equal to or less than 500 mm in depth and adhering a coagulating solution to an outside circumference of the membrane intermediate with applying external pressure depending on the depth of the coagulation solution in the coagulating bath to the membrane-forming resin adhered to the outside circumferential surface of a hollow reinforcing support body; and
    coagulating the membrane-forming resin solution as the coagulating solution flows along the outside circumferential surface of the membrane intermediate in such a way that at least a portion in a circumferential direction of an outermost boundary surface of the coagulating solution is treated as a free surface,
    wherein a length of contact of the coagulation solution with the membrane intermediate is from 200 to 3000 mm.

2. The method of claim 1, wherein, in the coagulating the membrane-forming resin solution, the membrane intermediate is transported in a vertical downward direction.

3. The method of claim 1, wherein, in the coagulating the membrane-forming resin solution, the membrane intermediate is transferred in a direction inclined with respect to a vertical plane.

4. The method of claim 1, wherein, in the adhering the coagulating solution to the outside circumference of the membrane intermediate, the coagulating solution is supplied from a portion of the circumferential direction, or from an entire circumference of the membrane intermediate.

5. The method of claim 1, wherein the hollow reinforcing support body is a hollow knitting thread, a hollow twining thread, or a hollow fiber membrane.

6. The method of claim 1, wherein a cross-sectional shape of the hollow reinforcing support body is annular.

7. The method of claim 1, wherein the membrane-forming resin solution comprises a polysulfone resin, a polyacrylonitrile, a cellulose derivative, a fluoride resin, or copolymers of these resins, which could be partially-substituted, or mixtures thereof.

8. The method of claim 7, wherein the membrane-forming resin solution comprises polysulfone, polyether sulfone, polyvinylidene fluoride, polyamide, polyester, polymethacrylate, or polyacrylate.

9. The method of claim 1, wherein the membrane-forming resin solution is obtained by a process comprising dissolving from 10 mass % to 30 mass % of membrane-forming resin solution into a solvent.

10. The method of claim 1, wherein the membrane-forming resin solution is obtained by a process comprising dissolving from 15 mass % to 25 mass % of membrane-forming resin solution into a solvent.

11. The method of claim 1, wherein the membrane-forming resin solution comprises at least one additive selected from the group consisting of a hydrophilic polymer, water, alcohol, and an inorganic salt.

12. The method of claim 11, wherein a concentration of the at least one additive in the membrane-forming resin solution is from 1 mass % to 20 mass %.

13. The method of claim 1, wherein a viscosity of the membrane-forming resin solution is from 20,000 to 500,000 mPa·sec at 40° C.

14. The method of claim 1, wherein the coagulating solution comprises water.

15. The method of claim 1, further comprising removing unnecessary components remaining in the membrane after coagulating.

* * * * *